US009497319B2

(12) United States Patent
Forrester

(10) Patent No.: US 9,497,319 B2
(45) Date of Patent: Nov. 15, 2016

(54) SYSTEM AND METHOD OF COMMUNICATING PRESENCE INFORMATION

(71) Applicant: ALE USA INC., Calabasas, CA (US)

(72) Inventor: Mark Forrester, Acton, MA (US)

(73) Assignee: Ale USA, Inc., Calabasas, CA (US)

( * ) Notice: Subject to any disclaimer, the term of this patent is extended or adjusted under 35 U.S.C. 154(b) by 0 days.

(21) Appl. No.: 14/718,185

(22) Filed: May 21, 2015

(65) Prior Publication Data

US 2016/0105553 A1 Apr. 14, 2016

Related U.S. Application Data

(60) Provisional application No. 62/062,792, filed on Oct. 10, 2014.

(51) Int. Cl.
| | |
|---|---|
| H04M 3/42 | (2006.01) |
| H04L 29/08 | (2006.01) |
| H04L 12/18 | (2006.01) |
| H04M 3/56 | (2006.01) |
| H04W 4/02 | (2009.01) |
| H04W 4/08 | (2009.01) |

(52) U.S. Cl.
CPC .......... *H04M 3/42365* (2013.01); *H04L 12/18* (2013.01); *H04L 67/24* (2013.01); *H04M 3/567* (2013.01); *H04W 4/023* (2013.01); *H04W 4/08* (2013.01)

(58) Field of Classification Search
CPC ................................................ H04M 3/42365
USPC ......................................................... 455/416
See application file for complete search history.

(56) References Cited

U.S. PATENT DOCUMENTS

| | | | |
|---|---|---|---|
| 2002/0078150 A1* | 6/2002 | Thompson | G06Q 10/10 709/204 |
| 2002/0107008 A1* | 8/2002 | Hendrey | H04W 76/002 455/416 |
| 2007/0182546 A1 | 8/2007 | Virk et al. | |
| 2009/0210802 A1 | 8/2009 | Hawkins et al. | |
| 2014/0220883 A1 | 8/2014 | Emigh et al. | |

OTHER PUBLICATIONS

European Search Report and Written Opinion, corresponding EP Application No. 15305299.8, Jun. 9, 2015, 7 pages.

* cited by examiner

*Primary Examiner* — Michael Neff
(74) *Attorney, Agent, or Firm* — Berenato & White, LLC

(57) ABSTRACT

A method of communicating presence information is provided. The method includes receiving (210) at a controller node a location identification indication from a mobile device. The location identification is based on a location identifier received at the mobile device from a broadcast node. A conference status of the mobile device is determined (220) at the controller node based on the location identification indication and a device identifier of the mobile device. The mobile device is instructed to update (230) a presence indication when the mobile device meets a conference status criteria.

17 Claims, 6 Drawing Sheets

SYSTEM AND METHOD OF COMMUNICATING PRESENCE INFORMATION

CROSS-REFERENCE TO RELATED APPLICATION

This application claims the benefit of U.S. Provisional Application No. 62/062,792, filed Oct. 10, 2014.

FIELD OF THE INVENTION

The present invention generally relates to communicating presence information of a conference participant. More particularly, the present invention is directed to modifying presence information about a conference participant based on the conference participant's location.

BACKGROUND OF THE INVENTION

A conference system can be utilized to facilitate communications between a plurality of users. For example, an audio, visual, and/or multimedia presentation can be shared with the plurality of users through a conference system. A conference system can include a device that allows users to transmit and receive audio, visual, or multimedia information such as a communication bridge or the like. However, users of a conference system are typically located in multiple physical locations making it difficult for participants to identify participants of the conference at alternative locations.

SUMMARY OF THE INVENTION

The present invention may solve one or more of the above-mentioned problems and/or achieve one or more of the above-mentioned desirable features. Other features and/or advantages may become apparent from the description which follows.

An aspect of the invention provides a method of communicating presence information. The method includes receiving at a controller node a location identification indication from a mobile device. The location identification is based on a location identifier received at the mobile device from a broadcast node. A conference status of the mobile device is determined at the controller node based on the location identification indication and a device identifier of the mobile device. The mobile device is instructed to update a presence indication when the mobile device meets a conference status criteria.

According to embodiments, such a method can comprise one or more of the features below.

In embodiments, the method further comprises:
transmitting a message from the controller node to each confirmed participant of a conference, wherein the message includes instructions to update the presence indication associated with the mobile device when the mobile device meets the conference status criteria.

In embodiments, the location identifier received at the mobile device is a globally unique identifier (GUID) associated with the broadcast node.

In embodiments, determining the conference status of the mobile device comprises:
determining whether a conference is established using a conference device; and
determining whether the mobile device is associated with an invited participant of the conference.

In embodiments, determining the conference status of the mobile device further comprises determining whether the mobile device is permitted to participate in the conference when the mobile device is associated with an uninvited participant of the conference.

In embodiments, determining whether the mobile device is associated with an invited participant of the conference comprises comparing the device identifier of the mobile device to a predetermined list of device identifiers associated with conference participants.

In embodiments, the method further comprises:
receiving an indication from the mobile device to communicate the presence indication associated with the mobile device; and
instructing the presence node to update the presence indication associated with the mobile device when the mobile device meets the conference status criteria and the indication from the mobile device to communicate the presence indication associated with the mobile device has been received.

In embodiments, the method further comprises:
instructing the mobile device to update a listing of conference participants at the mobile device when the mobile device meets the conference status criteria.

In embodiments, the method further comprises:
instructing the presence node to maintain a current presence indication associated with the mobile device when the mobile device does not meet the conference status criteria.

In embodiments, the mobile device receives the location identifier when the mobile device is located within a broadcast area of the broadcast node.

In embodiments, the invention also provides a controller node configured to
receive a location identification indication from a mobile device, wherein the location identification indication is based on a location identifier broadcast within a predetermined broadcast area of a broadcast node,
determine a conference status of the mobile device, wherein the conference status is based on the location identification indication and a device identifier associated with the mobile device, and
instruct a presence node to update a presence indication associated with the mobile device when the mobile device meets a conference status criteria.

In embodiments, the controller node further comprises a look-up table, the look-up table comprising a record for each of the broadcast nodes, the record including the location identifier.

In embodiments, the record further comprises an identifier of a conference device located at the same location as the broadcast node 104.

In embodiments, the record further comprises a location name associated to the location identifier, the location name being related to the broadcast area of the broadcast node.

In embodiments, the controller node is further configured to match the location identification indication received from the mobile device to the location identifier of the broadcast node which is stored in the look-up table.

In embodiments, the controller node is further configured to send to the broadcast node the location identifier which is stored in the look-up table.

In embodiments, the controller node is further configured to transmit a message to each confirmed participant of a conference, wherein the message includes instructions to update the presence indication associated with the mobile device when the mobile device meets the conference status criteria.

In embodiments, the location identifier broadcast from the broadcast node is a globally unique identifier (GUID) associated with the broadcast node.

In embodiments, the controller node is further configured to determine whether a conference is established over the communication system using the conference node, and determine whether the mobile device is associated with an invited participant of the conference.

In embodiments, the controller node is further configured to determine whether the mobile device is permitted to participate in the conference when the mobile device is associated with an uninvited participant of the conference.

In embodiments, the controller node is further configured to compare the device identifier of the mobile device to a predetermined list of device identifiers associated with conference participants to determine whether the mobile device is associated with an invited participant of the conference.

In embodiments, the controller node is further configured to receive an indication from the mobile device to communicate the presence indication associated with the mobile device, and instruct the presence node to update the presence indication associated with the mobile device when the mobile device meets the conference status criteria and the indication from the mobile device to communicate the presence indication associated with the mobile device has been received.

In embodiments, the controller node is further configured to instruct the mobile device to update a listing of conference participants at the mobile device when the mobile device meets the conference status criteria.

In embodiments, the controller node is further configured to instruct the presence node to maintain a current presence indication associated with the mobile device when the mobile device does not meet the conference status criteria.

In embodiments, the invention also provides a system of communicating presence information, comprising:

the controller node of any of claims 11 to 16, a broadcast node configured to broadcast the location identifier within the predetermined broadcast area, a conference node configured to establish a conference over a communication system, a presence node configured to receive instructions to update the presence indication associated with the mobile device.

In embodiments, the broadcast node is further configured to receive and store the location identifier.

In embodiments, the broadcast node is further configured to transmit the location identifier to the mobile device when the mobile device is located within the predetermined broadcast area of the broadcast node.

Other aspects of the invention, including apparatus, articles, methods, systems, assemblies, and the like which constitute part of the invention, will become more apparent upon reading the following detailed description of the exemplary embodiments in view of the drawings.

BRIEF DESCRIPTION OF THE DRAWINGS

The accompanying drawings are incorporated in and constitute a part of the specification. The drawings, together with the general description given above and the detailed description, serve to explain the principles of the invention. In such drawings.

DETAILED DESCRIPTION OF PREFERRED EMBODIMENTS

Reference will now be made in detail to exemplary embodiments and methods of the invention. It should be noted, however, that the invention in its broader aspects is not necessarily limited to the specific details, representative materials and methods, and illustrative examples shown and described in connection with the exemplary embodiments and methods.

Figure 1:
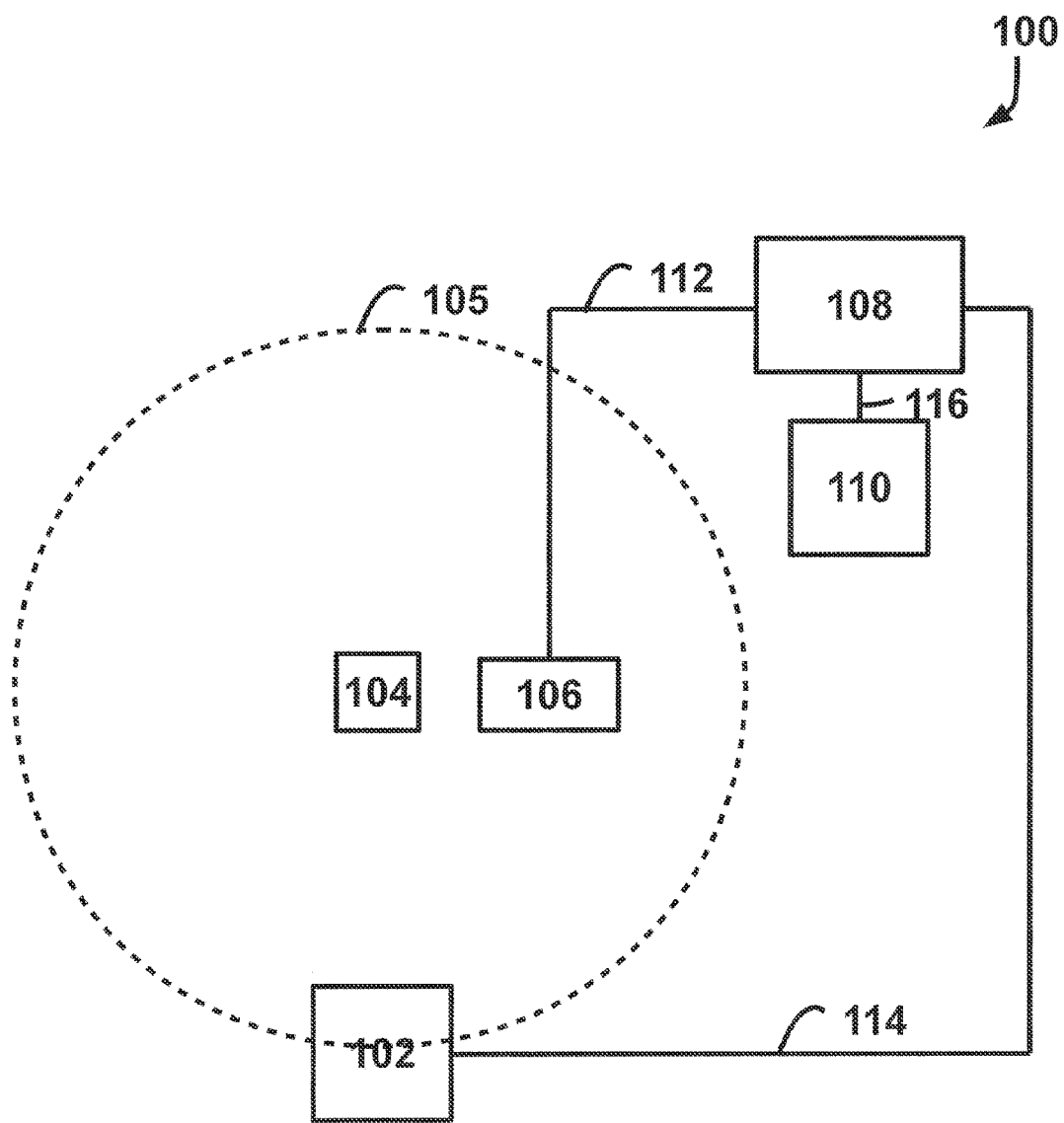
FIG. 1 illustrates an exemplary conference system according to an exemplary embodiment of the present disclosure.

FIG. 1 illustrates a system 100 for communicating presence information related to a conference. The system 100 includes a mobile device 102, a broadcasting node 104, a conference device 106, a controller node 108, and a presence node 110. While only one mobile device 102, one broadcasting node 104, and one conference device 106 are illustrated, system 100 can include any number of mobile devices 102, broadcasting nodes 104, and/or conference devices 106. In addition, other network elements may be present to facilitate communication within system 100 which are omitted for clarity, including processing nodes, routers, gateways, and physical and/or wireless data links for carrying data among the various network elements.

Mobile device 102 is any device configured to communicate over system 100 using a communication interface. For example, the mobile device 102 can be a wireless device such as a laptop, a smart phone, a tablet, a remote terminal unit, or any other wireless network accessible device, and combinations thereof. In an exemplary embodiment, mobile device 102 is configured to receive a location identification indication from broadcast node 104 when the mobile device 102 is within broadcast area 105.

The mobile device 102 can transmit and/or receive information from controller node 108 over communication link 114. Communication link 114 can use various communication media, such as air, space, metal, optical fiber, or some other signal propagation path—including combinations thereof.

The interface of the mobile device 102 includes one or more transceivers for transmitting and receiving data over communication system 100. In an exemplary embodiment, each mobile device 102 can include a transceiver associated with at least one long range wireless protocol, at least one short range wireless protocol, and/or another type of communication protocol.

Mobile device 102 can communicate information over system 100 using various communication services. For example, information communicated over system 100 can be transmitted in various forms such as email, internet links, digital messaging, graphic messaging, video messaging, audio messaging, text messaging, SMS messaging, etc.

Mobile device 102 includes a processor and associated circuitry to execute or direct the execution of computer-readable instructions to obtain information. Mobile device 102 retrieves and executes software from storage, which can include a disk drive, a flash drive, memory circuitry, or some other memory device, and which can be local or remotely accessible. The software includes computer programs, firmware, or some other form of machine-readable instructions, and may include an operating system, utilities, drivers, network interfaces, applications, or some other type of software, including combinations thereof. Mobile device 102 can receive instructions and other input at a user interface. In an exemplary embodiment, the user interface of device 102 can include an input device such as a peripheral or a touch sensitive display to allow a user to input instructions associated with communications over the system 100.

In an exemplary embodiment, a client or application interface is installed on the mobile device 102 to facilitate communications over system 100. For example, the interface is associated with an enterprise telecommunication switch. The interface can provide access to various enterprise telecommunication switch services such as conference participation, session recording, instant messaging, video broadcast, etc. where mobile device 102 can access the various enterprise telecommunication switch services via controller node 108 over communication link 114.

Broadcasting node 104 is a network node configured to broadcast a location identification indication within a predetermined broadcast area 105. Broadcasting node 104 can be a uniquely identifiable radiating device having a short range wireless communication radius up to approximately 60 meters. For example, the broadcasting node 104 can be a BLUETOOTH IBEACON or the like where the uniquely identifiable indicator transmitted by the broadcasting node 104 corresponds to an indication of location identification. The location identification indicator corresponds to a location in which the broadcasting node 104 is positioned. For example, when the broadcasting node 104 is located in a room in a building such as "Room 2020" or "Lexington Video Conference Room", the location identification indicator is unique to the location (e.g., the room) in which the broadcasting node 104 is positioned. In other words, each broadcasting node 104 within system 100 transmits a different location identification indicator and the broadcast area 105 of the broadcast node 104 substantially covers the physical area of a room.

The correlation between a location identifier associated with each broadcasting node 104 and a location of each broadcasting node 104 can be provided in various formats. For example, a look-up table can be created where an entry associated with each broadcasting node 104 can include a broadcast node device identifier such as an IP address or other device identifier unique to the broadcasting node 104, the unique location identifier associated with the broadcast node 104, and a character string associated with the location of the broadcast node 104 (e.g., "Room 2020" or "Lexington Video Conference Room"). In addition, a conference device identifier can be included with each entry where the conference device identifier is associated with the conference device 106 located at the same location as the broadcast node 104.

In an exemplary embodiment, the broadcasting node 104 continuously transmits the location identification indication at a predetermined interval. Alternatively, the broadcasting node 104 can be configured to only transmit the location identification indication when a conference device 106 is in use.

Broadcasting node 104 can include a processor and associated circuitry to execute or direct the execution of computer-readable instructions to obtain information. Broadcasting node 104 can retrieve and execute software from storage, which can include a disk drive, a flash drive, memory circuitry, or some other memory device, and which can be local or remotely accessible. The software includes computer programs, firmware, or some other form of machine-readable instructions, and may include an operating system, utilities, drivers, network interfaces, applications, or some other type of software, including combinations thereof.

Conference device 106 is a device configured to facilitate conference communications over system 100. Conference device 106 can support the communication of an audio, visual, and/or multimedia presentation between two or more participants over system 100 where at least two of the participants are located at different locations. For example, the conference device 106 can be any device configured to allow users to transmit and/or receive audio, visual, or multimedia information such as a communication bridge or the like. It is noted that the broadcasting node 104 and the conference device 106 can be separate devices. Alternatively, the broadcasting node 104 and the conference device 106 can be integrated together.

The conference device 106 can transmit to and/or receive information from controller node 108 over communication link 112. Communication link 112 can use various communication media, such as air, space, metal, optical fiber, or some other signal propagation path—including combinations thereof.

Conference device 106 includes an interface having one or more transceivers for transmitting and receiving data over communication system 100. In an exemplary embodiment, conference device 106 can include a transceiver associated with at least a wireless protocol, at least one wired protocol, and/or another type of communication protocol.

Conference device 106 can communicate information over system 100 using various communication services. For example, information communicated over system 100 can be transmitted in various forms such as audio, digital information such as email, internet links, digital messaging, graphic messaging, video messaging, audio messaging, text messaging, SMS messaging, etc.

Conference device 106 can include a processor and associated circuitry to execute or direct the execution of computer-readable instructions to obtain information. Conference device 106 can retrieve and execute software from storage, which can include a disk drive, a flash drive, memory circuitry, or some other memory device, and which can be local or remotely accessible. The software includes computer programs, firmware, or some other form of machine-readable instructions, and may include an operating system, utilities, drivers, network interfaces, applications, or some other type of software, including combinations thereof. Conference device 106 can receive instructions and other input at a user interface.

Controller node 108 can be any network node configured to manage, monitor, and/or establish communications over system 100. The controller node 108 can be further configured to record and replay activities that have occurred over the communication system 100 such as any communications associated with a conference, provide an application programming interface (API) for any client applications built for the network, etc. In an exemplary embodiment, the API can be used to generate the look up-table reflecting the correlation between a location identifier associated with each broadcasting node 104 and a location of each broadcasting node 104. During the deployment of the system, the controller node 108 communicates with each broadcast node 104 to determine a broadcast node device identifier associated with each broadcast node 104 and each broadcast node device identifier is then stored in the look-up table at the controller node 108. For instance, each broadcast node 104 can transmit a unique broadcast node device identifier to the controller node 108. This transmission can be in response to a request sent by the controller node 108 or could be initiated by the broadcast node 104 when a connection is established with the network. In this case, the unique broadcast node device identifier is pre-assigned to the broadcast node prior to deployment (e.g., static device identifier) where the pre-assigned broadcast node device identifier could be provided by the manufacturer of the broadcast node 104 or pre-assigned by a network administrator. Alternatively, the unique broadcast node device identifier can be assigned to the broadcast node 104 by the controller node 108 (e.g., static device identifier). For instance, when the broadcast node 104 establishes a connection with the network, the controller node 108 can assign the broadcast node 104 a broadcast node device identifier where the controller node 108 stores the broadcast node device identifier within the look-up table. This broadcast node device identifier is then transmitted to the broadcast node 104 where the broadcast node 104 locally stores the unique broadcast node device identifier. Using the API, the controller node 108 then creates an entry associated with each broadcast node 104, where each entry includes the broadcast node device identifier, the location identifier associated with each broadcasting node 104, an indication of location of each broadcasting node 104 (e.g., information associated with the physical location including a character string, etc.), and/or a related conference device identifier.

In addition, the controller node 108 stores a list of conference participants, a device identifier associated with each conference participant, and information associated with the location identification indication transmitted by each broadcast node 104 within the system 100. Other additional identifying information about the participants of the conference can be stored at the controller node 108. For example, details regarding the conference can be stored at the controller node 108 including a start time, an expected conference duration time, a conference identifier, an identification of a user responsible or the owner of the conference, and any other exiting metadata about the conference.

In an exemplary embodiment, the controller node 108 can be further configured to determine a conference status associated with a user of a mobile device 102. For example, after a conference is initiated using the conference device 106 and the mobile device 102 receives a location identification indication within the broadcast area 105 of the broadcast node 104, the controller node 108 receives a communication from the mobile device 102 including information associated with the location identification indication and a device identifier of the mobile device. Based on the location identification indication, controller node 108 can determine whether a conference is established using the conference device 106. Moreover, based on the device identifier, controller node 108 can determine whether a participant associated with the mobile device 102 is included within the list of identified participants.

The controller node 108 can transmit to and/or receive information from presence node 110 over communication link 116. Communication link 116 can use various communication media, such as air, space, metal, optical fiber, or some other signal propagation path—including combinations thereof.

Controller node 108 includes an interface having one or more transceivers for transmitting and receiving data over communication system 100. In an exemplary embodiment, controller node 108 can include a transceiver associated with at least a wireless protocol, at least one wired protocol, and/or another type of communication protocol.

Controller node 108 can communicate information over system 100 using various communication services. For example, information communicated over system 100 can be transmitted in various forms such as audio, digital information such as email, internet links, digital messaging, graphic messaging, video messaging, audio messaging, text messaging, SMS messaging, etc.

Controller node 108 can include a processor and associated circuitry to execute or direct the execution of computer-readable instructions to obtain information. Controller node 108 can retrieve and execute software from storage, which can include a disk drive, a flash drive, memory circuitry, or some other memory device, and which can be local or remotely accessible. The software includes computer programs, firmware, or some other form of machine-readable instructions, and may include an operating system, utilities, drivers, network interfaces, applications, or some other type of software, including combinations thereof. Controller node 108 can receive instructions and other input at a user interface.

In an embodiment, a predefined look-up table comprises a record for each of the broadcast nodes 104, the record including the unique location identifier corresponding to a location of the broadcast node 104.

Presence node 110 is configured to accept, store, and communicate presence information associated with users of system 100. In an exemplary embodiment, presence node 110 is a presence server that stores information associated with the ability and willingness of a user of system 100 to communicate. For example, the presence information is utilized to create a personal availability record of a user of system 100 where the personal availability record can be made available for distribution to one or more other users of system 100. The presence information can include at least one of a location indication of a user, a communication status of a user such as "available", "busy", "away", etc., a unique message provided by the user, etc. The presence information can be communicated to other users to represent the presence and/or availability of a specific user. The presence information can be determined for each user of the system 100 or any specifically identified user.

Presence node 110 includes an interface having one or more transceivers for transmitting and receiving data over communication system 100. In an exemplary embodiment, presence node 110 can include a transceiver associated with at least a wireless protocol, at least one wired protocol, and/or other type of communication protocol.

Presence node 110 can include a processor and associated circuitry to execute or direct the execution of computer-readable instructions to obtain information. Presence node 110 can retrieve and execute software from storage, which can include a disk drive, a flash drive, memory circuitry, or some other memory device, and which can be local or remotely accessible. The software includes computer programs, firmware, or some other form of machine-readable instructions, and may include an operating system, utilities, drivers, network interfaces, applications, or some other type of software, including combinations thereof.

In operation, system 100 can facilitate the communication of presence information of a user associated with mobile device 102. When a user enters a broadcast area 105 of broadcasting node 104, mobile device 102 receives a location identification indication unique to broadcasting node 104. For example, the location identification indication can be a globally unique identifier (GUID) associated with the broadcasting node 104. Mobile device 102 then transmits the location identification indication and a device identifier associated with the mobile device 102 to the controller node 108. Controller node 108 determines whether a conference has been established using conference device 106 based on the location identification indication. For example, controller node 108 determines the location of the conference device 106. In an exemplary embodiment, the controller node 108 uses the location identification indication received from the broadcasting node 104 at the mobile device 102 to determine the unique conference device 106 and the corresponding location using the look-up table stored at the controller node 108. Based on the location identification indication and using the location information, controller node 108 monitors and determines whether a conference has been established using conference device 106.

When controller node 108 determines that a conference has been established at the location associated using conference device 106, controller node 108 determines whether a user associated with mobile device 102 is an invited participant in the conference based on the device identifier. For example, a predetermined list of participants can be stored at the controller node 108 where a unique device identifier is correlated with each participant.

When a conference has been established and the user associated with the device identifier of mobile device 102 is included in the predetermined list of participants of the conference, a presence indicator is modified to reflect that the user associated with mobile device 102 is present at a location that has access to the conference. In an exemplary embodiment, when controller node 108 receives a location identification indication and device identifier from a user that is not on a predetermined list of participants and a predetermined criteria has been established indicating that all uninvited participants at the location associated with the conference device 106 are to be included in the presence indication, controller node 108 can update the presence information to reflect that the uninvited user is present within the broadcast area 105.

Presence information can be communicated in various ways. A listing of all participants of the conference associated with conference device 106 as well as various availability status indicators associated with each participant can be displayed on a device associated with each confirmed conference participant (e.g., each participant who is within the broadcast area 105 of the broadcast device 104). For example, an image, graphic, or other visual representation can be displayed on the device associated with the confirmed conference participant. The device associated with the confirmed conference participant can be mobile device 102 and/or any other device configured to communicate over system 100 such as a laptop or tablet device. Further, an audio cue can be communicated when a participant joins the conference and it is determined that the participant is within the broadcast area 105 of the broadcast device 104.

Presence information can be modified based on a user indication preference or automatically. In an exemplary embodiment, after controller node 108 determines that a conference has been established using conference device 106, the user associated with mobile device 102 is located within the broadcast area 105 of the broadcast node 104, and the user is a confirmed conference participant, controller node 108 can transmit an indication to mobile device 102 to allow a user to control whether the user's presence information is communicated. For example, controller node 108 can instruct mobile device 102 to display a prompt to the user indicating that the user is within broadcast area 105 and a conference has been established using conference device 106 and requesting whether the user would like to update the user's presence information to reflect that the user is present for the conference. When the user indicates that the presence information should reflect that the user is present for the conference, the user's presence information is modified such that the user is added to a list of confirmed participants of the conference. When the user agrees to update presence information, a presence message is transmitted to the controller node 108, the controller node 108 transmits the information to the presence node 110 updating the user's presence status, and the controller node 108 transmits a message to each confirmed participant updating the presence information displayed on the device corresponding to each user. In an exemplary embodiment, the presence information can include an indication of the user's location. For example, the controller node 108 can determine the location based on the look-up table where the location is associated with a character string associated with the location of the broadcast node 104. A presence message can be sent to all confirmed participants of the conference indicating that the user is now at a particular location where the conference has been established. In an exemplary embodiment, the presence message includes the character string associated with the location of the broadcast node (e.g., "Room 2020").

In another exemplary embodiment, the presence information can be updated automatically, without any input from the user. For example, after the controller node 108 determines that the user is an invited participant to the established conference, the controller node 108 can instruct the presence node 110 to update the status of the user and communicate a presence message to each confirmed conference participant to update the presence information associated with the user.

In yet another exemplary embodiment, additional users can be participating in the conference from other locations where a broadcasting node 104 is not present. When the controller node 108 updates the presence status of the user associated with mobile device 102, the additional users are also notified of the change in presence status of the user associated with mobile device 102. It is noted that the presence status of the users participating in the conference from locations without a broadcasting node 104 is only updated when communications are initiated to join the conference.

Figure 2:
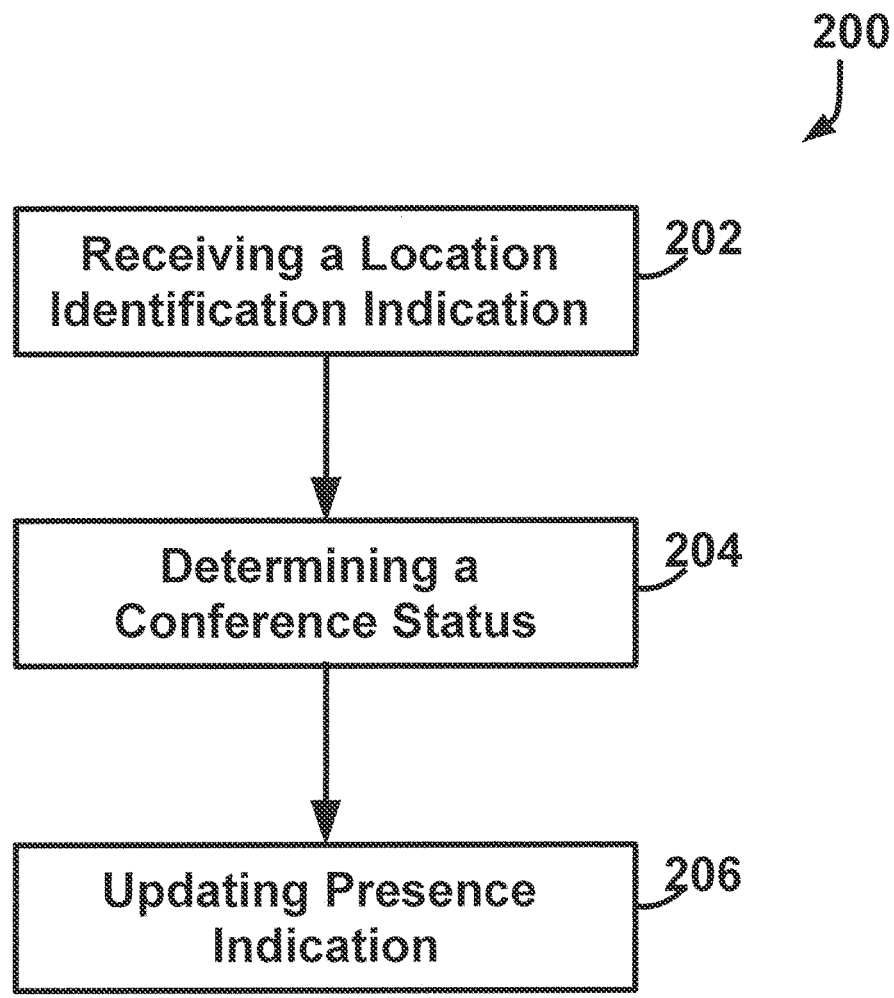
FIG. 2 illustrates an exemplary method of communicating presence information over a communication system according to an exemplary embodiment of the present disclosure.

FIG. 2 illustrates a flow chart of an exemplary method 200 for communicating presence over a communication system. The method will be discussed with reference to the exemplary communication system 100 illustrated in FIG. 1. However, the method can be implemented with any suitable communication system. In addition, although FIG. 2 depicts steps performed in a particular order for purposes of illustration and discussion, the methods discussed herein are not limited to any particular order or arrangement. One skilled in the art, using the disclosures provided herein, will appreciate that various steps of the methods can be omitted, rearranged, combined, and/or adapted in various ways.

At 210, a location identification indication is received. For example, controller node 108 receives a location identification indication from mobile device 102. In an exemplary embodiment, the location identification indication is based on a location identifier received at the mobile device 102 from a broadcast node 104 while the mobile device 102 is within broadcast area 105. The location identification indication can include a GUID where the GUID is unique to broadcasting node 104. In addition, mobile device 102 can further communicate a device identifier to controller device 108 where the device identifier is unique to mobile device 102.

Figure 3:
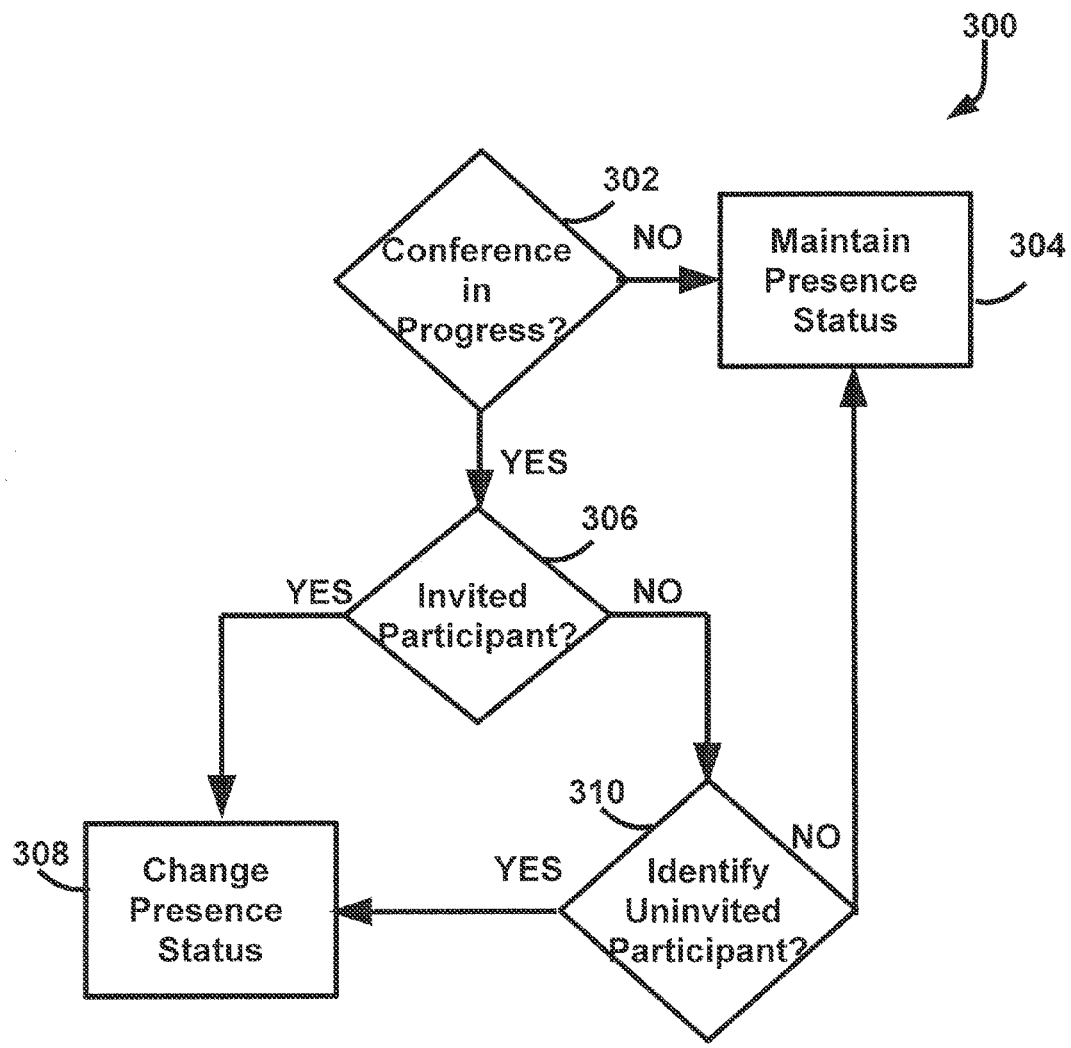
FIG. 3 illustrates a method of determining a conference status in a conference system according to an exemplary embodiment of the present disclosure.

A conference status is determined at 220 and a presence indication is updated at 230, as described further herein. For example, controller node 108 determines a conference status associated with mobile device 102 based on the location identification indication and the device identifier associated with mobile device 102. In an exemplary embodiment illustrated in FIG. 3, controller node 108 determines the conference status by first determining whether a conference has been established and is in progress at 302. The controller node 108 can determine whether a conference is in progress based on the location identification information. For example, the controller node 108 determines the location of the mobile device 102 based on the location identifier received when the mobile device 102 enters the broadcast area 105 of the broadcast node 104. The controller node 108 identifies a conference device associated with the location associated with the location identifier received by the mobile device. In this example, controller node 108 determines whether a conference has been established using conference device 106. When controller node 108 determines that a conference has been established using conference device 106 and that mobile device 102 is within broadcast area 105, controller node 108 can further determine whether mobile device 102 is associated with an invited participant of the conference at 306. However, when controller node 108 determines that a conference has not been established, controller node 108 determines that the presence status of the user associated with the mobile device 102 is maintained at 304.

Controller node 108 determines whether the user associated with mobile device 102 is an invited participant of the established conference based on the device identifier associated with mobile device 102. For example, controller node 108 can compare the device identifier with a list of predetermined conference participants where each predetermined conference participant has a unique device identifier corresponding with each participant device. When controller node 108 determines that mobile device 102 is associated with an invited participant, controller node 108 initiates modifying the presence status of the user associated with mobile device 102 at 308.

When the controller node 108 determines that mobile device 102 is not associated with an invited participant, controller node 108 can determine whether to identify the uninvited participant in the presence status at 310. For example, when a predetermined criteria is selected within the system to identify uninvited conference participants in the presence information, such as by a system administrator, controller node 108 initiates modifying the presence status of the uninvited participant at 308. When a predetermined criteria is not selected to identify uninvited conference participants, controller node 108 maintains the presence status of the user associated with mobile device 102 at 304 while allowing the user to participate in the established conference. Alternatively, when the controller node 108 determines that an uninvited participant is within the broadcast area 105, controller node 108 can prevent the uninvited participant from participating in the established conference or limit the uninvited participant's access to the established conference to a specific location. The controller node 108 can prevent the uninvited participant from participating in the established conference by denying any request to establish communication to the conference device 108.

After the conference status of the mobile device 102 is determined at 220, the presence indication can be updated at 230. In an exemplary embodiment, after controller node 108 determines the conference status associated with mobile device 102, controller node 108 transmits an indication to mobile device 102 to allow a user to control whether the user's presence information is communicated. For example, controller node 108 can instruct mobile device 102 to display a prompt to the user indicating that the user is within broadcast area 105 and a conference has been established using conference device 106 and requesting whether the user would like to update the user's presence information to reflect that the user is present for the conference. When the user indicates that the presence information should reflect that the user is present for the conference, the user's presence information is modified such that the user is added to a list of confirmed participants of the conference. When the user agrees to update presence information, a presence message is transmitted to the controller node 108, the controller node 108 transmits the information to the presence node 110 updating the user's presence status, and the controller node 108 transmits a message to each confirmed participant updating the presence information displayed on the device corresponding to each user. In an exemplary embodiment, the presence information can include an indication of the user's location. For example, a presence message can be sent to all confirmed participants of the conference indicating that the user is now in "Room 2020" where the conference has been established.

In another exemplary embodiment, the presence information can be updated automatically, without any input from the user. For example, after the controller node 108 determines that the user is an invited participant to the established conference, the controller node 108 can instruct the presence node 110 to update the status of the user and communicate a presence message to each confirmed conference participant to update the presence information associated with the user.

Figure 4:
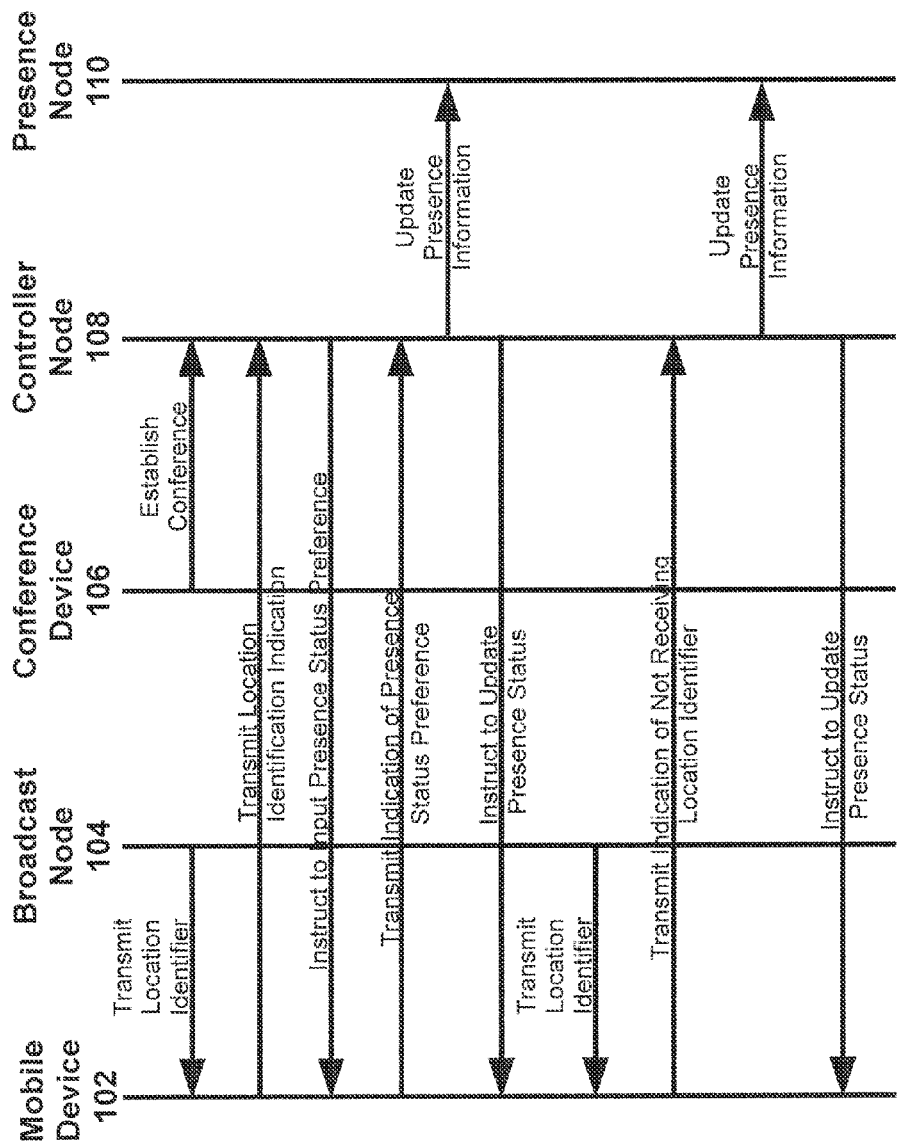
FIG. 4 illustrates an exemplary signaling diagram that illustrates an exemplary method of communicating presence information according to an exemplary embodiment of the present disclosure.
Figure 5:
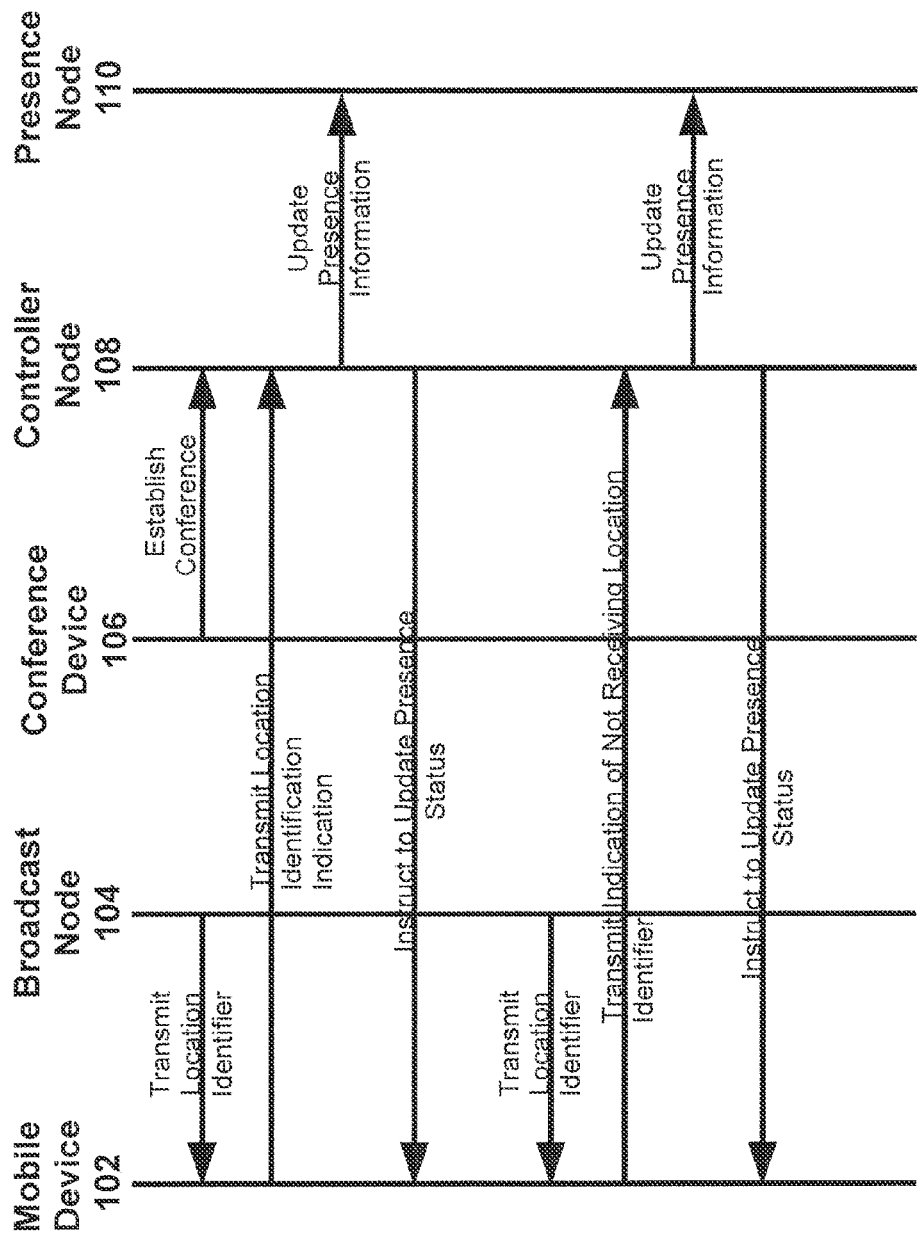
FIG. 5 illustrates an exemplary signaling diagram that illustrates another exemplary method of communicating presence information according to an exemplary embodiment of the present disclosure.

FIGS. 4 and 5 are exemplary signaling diagrams that illustrate exemplary methods of communicating presence information in a communication system. The signal diagrams will be discussed with reference to the exemplary communication system 100 illustrated in FIG. 1. However, the signaling diagram can be implemented with any suitable communication system. For example, a plurality of broadcasting nodes can be in communication with controller node 108 where any mobile device within the broadcasting area of each broadcasting node can communicate a location identification indication unique to the broadcasting node. In addition, although FIGS. 4 and 5 depict signaling performed in a particular order for purposes of illustration and discussion, the signaling discussed herein is not limited to any particular order. Moreover, additional signaling not included in FIGS. 4 and 5 can also be performed.

For the purposes of FIG. 4, it is assumed that a conference has already been established using conference device 106. Specifically, conference device 106 can send a request to establish a conference to controller node 108 based on an input received at the conference device 106. Alternatively, controller node 108 can instruct conference device 106 to establish a conference without any prompt or input received at the conference device. In addition, it is also assumed that broadcast node 104 has initiated broadcasting a location identifier within the broadcast area 105. Broadcast node 104 can initiate broadcasting the location identifier after the conference has been established or broadcast node 104 can continually broadcast location identifier no matter whether a conference has been established or not. After broadcast node 104 initiates broadcasting the location identifier, broadcast node 104 will broadcast the location identifier at a predetermined time interval. In an exemplary embodiment, broadcast node 104 continues to broadcast the location identifier until no mobile devices are detected within the broadcast area 105. For example, broadcast node 104 can be instructed to discontinue broadcasting the location identifier when the controller node 108 no longer receives a location identification indication from any mobile device 102 within the broadcast area.

After a conference has been established using conference device 106 and mobile device 102 receives a location identifier from broadcast node 104, mobile device 102 can transmit a location identification indication to the controller node 108. Controller node 108 determines the conference status of the mobile device 102 based on the location identification indication and when the user associated with the mobile device 102 is an invited participant of the established conference, controller node 108 instructs mobile device 102 to input a presence status preference. For example, controller node 108 can instruct mobile device 102 to display a prompt to the user associated with mobile device 102 indicating that the user is within broadcast area 105 and a conference has been established using conference device 106 and requesting whether the user would like to update the user's presence information to reflect that the user is present for the conference. When the user indicates that the presence information should reflect that the user is present for the conference, the mobile device 102 transmits an indication of presence status preference to controller node 108. When the user agrees to update presence information, the controller node 108 transmits the information to the presence node 110 updating the user's presence status, and the controller node 108 transmits a message to each confirmed participant updating the presence information displayed on the device corresponding to each user. One of ordinary skill would recognize that while FIG. 4 illustrates that controller node 108 instructs mobile device 102 to update presence status, the message to update the presence status would be sent to all confirmed participants in the established conference.

Broadcast node 104 continues to broadcast a location identifier during the conference. When mobile device 102 is no longer within the broadcast area 105 of the broadcast node 104, mobile device 102 can determine that a location identifier has not been received. For example, when a user leaves the premises of the conference and moves beyond the broadcast area 105, mobile device 102 no longer receives location identifier messages from broadcast node 104. After a predetermined period of time expires and no location identifier is received by the mobile device 102, mobile device 102 transmits an indication of not receiving a location identifier from broadcast node 104 to the controller node 108. Based on the indication of not receiving a location identifier, controller node 108 instructs presence node 110 to update the presence status of the user associated with the mobile device 102. Controller node 108 further instructs all devices associated with the conference to update the presence status of the user associated with mobile device 102 to reflect that the user is no longer present within the broadcast area 105.

The signaling diagram illustrated in FIG. 5 includes similar signaling flows as described in FIG. 4 and only the different signaling flows will be discussed. Specifically, FIG. 5 illustrates a signaling diagram that contemplates initiating a presence status of a user associated with mobile device 102 without any input from the user. For example, after mobile device 102 transmits the location identification indication to controller node 108. Controller node 108 determines that the user associated with mobile device 102 is an invited participant of the established conference, controller node 108 instructs presence node 110 to update the presence information of the user associated with the mobile device 102 and instructs all devices associated with the conference to update the presence status of the user associated with the mobile device 102 to reflect that the user is no longer present within the broadcast area 105.

All of the above embodiments contemplate that a conference already be established using conference device 106. However, when the mobile device 102 transmits the location identification indication prior to a conference being established using the conference device 106, controller device 108 determines that no conference has been established. In one exemplary embodiment, the controller device 108 can instruct the mobile device 102 to continue to transmit the location identification indication until a conference has been established before the controller device 108 updates any presence information of the user associated with the mobile device 102. In an alternative embodiment, after receiving the location identification indication from mobile device 102 and determined that no conference has been established using conference device 106, controller device 108 can determine whether the user associated with mobile device 102 is an invited participant of a conference that is scheduled to begin within a predetermined period of time. When the user is an invited participant of a conference scheduled to begin within a predetermined period of time, controller node 108 can initiate updating presence information of the user associated with the mobile device 102 prior to establishing a conference. For example, when a user arrives in the room (within the broadcast area 105) 15 minutes prior to the scheduled conference, controller node 108 updates the presence information of the user of the mobile device 102 prior to establishing a conference using conference device 106.

Figure 6:
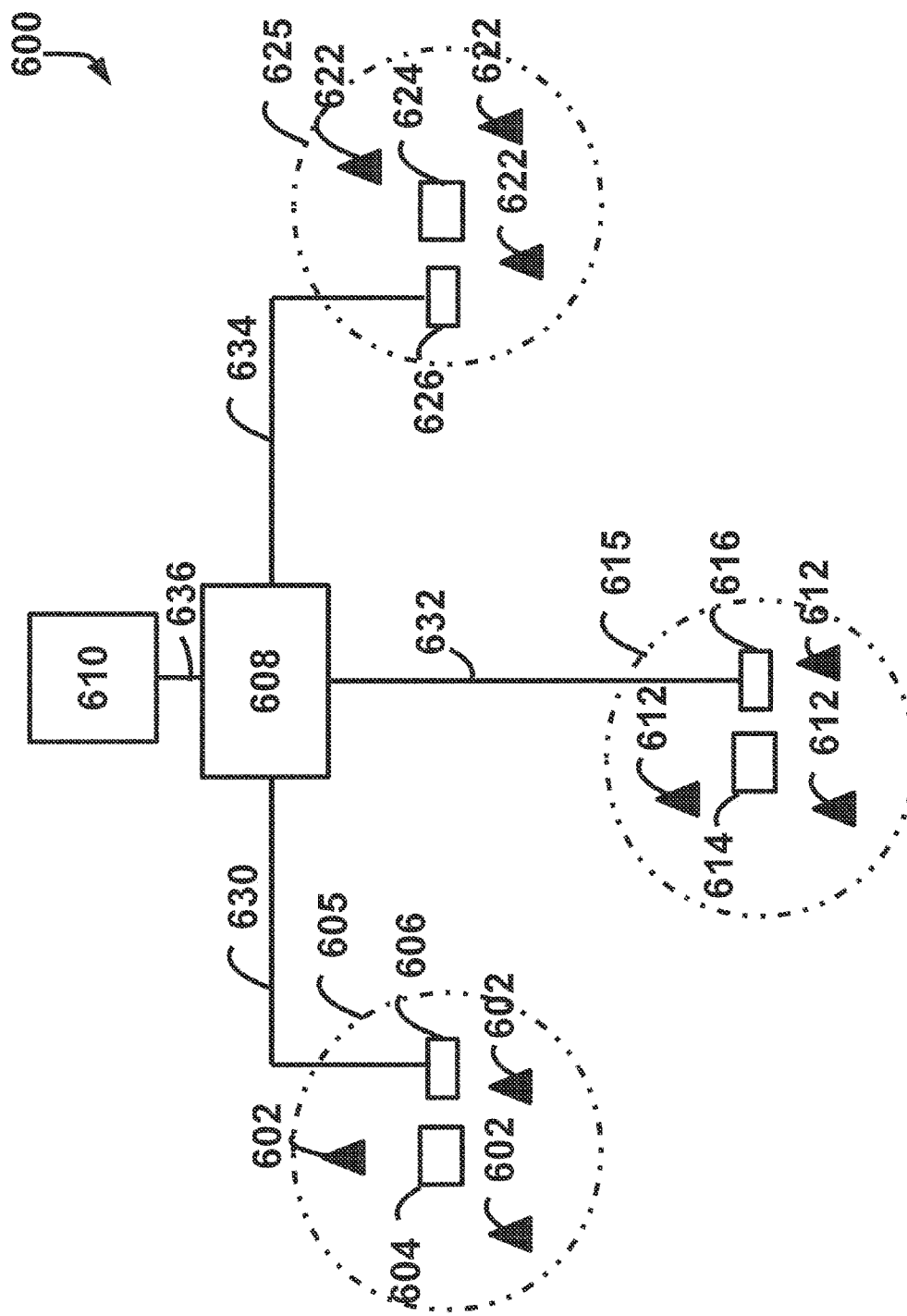
FIG. 6 illustrates another exemplary conference system according to an exemplary embodiment of the present disclosure.

FIG. 6 illustrates a system 600 for communicating presence information related to a conference. The system 600 includes mobile devices 602, 612, 622, broadcasting nodes 604, 614, 624, conference devices 606, 616, 626, a controller node 608, and a presence node 610. While only three mobile devices are illustrated within each broadcasting area, three broadcasting nodes 604, 614, 624, and three conference devices 606, 616, 626 are illustrated, system 600 can include any number of mobile devices 602, 612, 622, broadcasting nodes 604, 614, 624, and/or conference devices 606, 616, 626. In addition, other network elements may be present to facilitate communication within system 600 which are omitted for clarity, including processing nodes, routers, gateways, and physical and/or wireless data links for carrying data among the various network elements.

Mobile devices 602, 612, 622 are any device configured to communicate over system 600 using a communication interface. For example, the mobile devices 602, 612, 622 can be a wireless device such as a laptop, a smart phone, a tablet, a remote terminal unit, or any other wireless internet accessible device, and combinations thereof. In an exemplary embodiment, mobile devices 602 are configured to receive a first location identification indication from broadcast node 604 when the mobile device 602 are within broadcast area 605, mobile devices 612 are configured to receive a second location identification indication from broadcast node 614 when mobile devices 612 are within broadcast area 615, and mobile devices 622 are configured to receive a third location identification indication from broadcast node 624 when mobile devices 624 are within broadcast area 625. The first, second, and third location identification indications are all different from one another and are unique to the broadcasting node 604, 614, 624.

The mobile devices 602, 612, 622 can transmit and/or receive information from controller node 608 over a communication link. However, these communication links are not illustrated in FIG. 6 for the purposes of clarity. The communication links between mobile devices 602, 612, 622 and controller node 608 can use various communication media, such as air, space, metal, optical fiber, or some other signal propagation path—including combinations thereof.

Each interface of the mobile devices 602, 612, 622 includes one or more transceivers for transmitting and receiving data over communication system 600. In an exemplary embodiment, each mobile device 602, 612, 622 can include a transceiver associated with at least one long range wireless protocol, at least one short range wireless protocol, and/or another type of communication protocol.

Mobile devices 602, 612, 622 can communicate information over system 600 using various communication services. For example, information communicated over system 600 can be transmitted in various forms such as email, internet links, digital messaging, graphic messaging, video messaging, audio messaging, text messaging, SMS messaging, etc.

Mobile devices 602, 612, 622 each include a processor and associated circuitry to execute or direct the execution of computer-readable instructions to obtain information. Mobile devices 602, 612, 622 retrieve and execute software from storage, which can include a disk drive, a flash drive, memory circuitry, or some other memory device, and which can be local or remotely accessible. The software includes computer programs, firmware, or some other form of machine-readable instructions, and may include an operating system, utilities, drivers, network interfaces, applications, or some other type of software, including combinations thereof. Mobile devices 602, 612, 622 can receive instructions and other input at a user interface. In an exemplary embodiment, the user interface of devices 602, 612, 622 can include an input device such as a peripheral or a touch sensitive display to allow a user to input instructions associated with communications over the system 600.

In an exemplary embodiment, a client or application interface is installed on each mobile device 602, 612, 622 to facilitate communications over system 600. For example, the interface is associated with an enterprise telecommunication switch. The interface can provide access to various enterprise telecommunication switch services such as conference participation, etc. where mobile devices 602, 612, 622 can access the various enterprise telecommunication switch services via controller node 608.

Broadcasting nodes 604, 614, 624 are network nodes configured to broadcast a location identification indication within predetermined broadcast areas 605, 615, 625, respectively. Broadcasting nodes 604, 614, 624 can be uniquely identifiable radiating devices having a short range wireless communication radius up to approximately 60 meters. For example, each broadcasting node 604, 614, 624 can be a BLUETOOTH IBEACON or the like where the uniquely identifiable indicator transmitted by the broadcasting node 604, 614, 624 corresponds to an indication of location identification. The location identification indicator corresponds to a location in which the each broadcasting node 604, 614, 624 is positioned. For example, when the broadcasting node 604, 614, 624 is located in a room in a building such as "Room 2020" or "Lexington Video Conference Room", the location identification indicator is unique to the location (e.g., the room) in which the broadcasting node 604, 614, 624. In other words, each broadcasting node 604, 614, 624 within system 600 transmits a different location identification indicator. The broadcasting nodes 604, 614, 624 can be located in any location. For example, they can be located within the same building, within different buildings, and even within different countries. In an exemplary embodiment, the broadcasting nodes 604, 614, 624 continuously transmit the location identification indication at a predetermined interval. Alternatively, the broadcasting nodes 604, 614, 624 can be configured to only transmit the location identification indication when the conference device 106 is in use.

Broadcasting nodes 604, 614, 624 can include a processor and associated circuitry to execute or direct the execution of computer-readable instructions to obtain information. Broadcasting nodes 604, 614, 624 can retrieve and execute software from storage, which can include a disk drive, a flash drive, memory circuitry, or some other memory device, and which can be local or remotely accessible. The software includes computer programs, firmware, or some other form of machine-readable instructions, and may include an operating system, utilities, drivers, network interfaces, applications, or some other type of software, including combinations thereof.

Conference devices 606, 616, 626 are a device configured to facilitate conference communications over system 600. Conference devices 606, 616, 626 can support the communication of an audio, visual, and/or multimedia presentation between two or more participants over system 600 where at least two of the participants are located at different locations. For example, the conference devices 606, 616, 626 can be any device configured to allow users to transmit and/or receive audio, visual, or multimedia information such as a communication bridge or the like. It is noted that the broadcasting nodes 604, 614, 624 and the conference device 606, 616, 626 can be separate devices. Alternatively, each broadcasting node 604, 614, 624 and respective conference device 606, 616, 626 can be integrated together.

The conference devices 606, 616, 626 can transmit to and/or receive information from controller node 608 over communication links 630, 632, 634, respectively. Communication links 630, 632, 634 can use various communication media, such as air, space, metal, optical fiber, or some other signal propagation path—including combinations thereof.

Each conference device 606, 616, 626 includes an interface having one or more transceivers for transmitting and receiving data over communication system 600. In an exemplary embodiment, conference device 606, 616, 626 can include a transceiver associated with at least a wireless protocol, at least one wired protocol, and/or another type of communication protocol.

Conference devices 606, 616, 626 can communicate information over system 600 using various communication services. For example, information communicated over system 600 can be transmitted in various forms such as audio, digital information such as email, internet links, digital messaging, graphic messaging, video messaging, audio messaging, text messaging, SMS messaging, etc.

Conference devices 606, 616, 626 can include a processor and associated circuitry to execute or direct the execution of computer-readable instructions to obtain information. Conference devices 606, 616, 626 can retrieve and execute software from storage, which can include a disk drive, a flash drive, memory circuitry, or some other memory device, and which can be local or remotely accessible. The software includes computer programs, firmware, or some other form of machine-readable instructions, and may include an operating system, utilities, drivers, network interfaces, applications, or some other type of software, including combinations thereof. Conference devices 606, 616, 626 can receive instructions and other input at a user interface.

Controller node 608 can be any network node configured to manage, monitor, and/or establish communications over system 600. In an exemplary embodiment, the controller node 608 stores a list of conference participants, a device identifier associated with each conference participant, and information associated with the location identification indication transmitted by each broadcast node 604, 614, 624 within the system 600. In addition, other identifying information about the participants of the conference can be stored at the controller node 608. For example, details regarding the conference can be stored at the controller node 608 including a start time, an expected conference duration time, a conference identifier, an identification of a user responsible or the owner of the conference, and any other exiting metadata about the conference.

In an exemplary embodiment, the controller node 608 can be further configured to determine a conference status associated with a user of a mobile device 602, 612, 622. For example, after a conference is initiated using the conference devices 606, 616, 626 and the mobile devices 602, 612, 622 receive a location identification indication within the respective broadcast areas 605, 615, 625 of the broadcast nodes 604, 614, 624, the controller node 608 receives a communication from at least one of the mobile devices 602, 612, 622 including information associated with the location identification indication and a device identifier of the mobile device. Based on the location identification indication, controller node 608 can determine whether a conference is established using the respective conference device 606, 616, 626. Moreover, based on the device identifier, controller node 608 can determine whether a participant associated with the mobile device 602, 612, 622 is included within the list of identified participants.

The controller node 608 can transmit to and/or receive information from presence node 610 over communication link 636. Communication link 636 can use various communication media, such as air, space, metal, optical fiber, or some other signal propagation path—including combinations thereof.

Controller node 608 includes an interface having one or more transceivers for transmitting and receiving data over communication system 600. In an exemplary embodiment, controller node 608 can include a transceiver associated with at least a wireless protocol, at least one wired protocol, and/or another type of communication protocol.

Controller node 608 can communicate information over system 600 using various communication services. For example, information communicated over system 600 can be transmitted in various forms such as audio, digital information such as email, internet links, digital messaging, graphic messaging, video messaging, audio messaging, text messaging, SMS messaging, etc.

Controller node 608 can include a processor and associated circuitry to execute or direct the execution of computer-readable instructions to obtain information. Controller node 608 can retrieve and execute software from storage, which can include a disk drive, a flash drive, memory circuitry, or some other memory device, and which can be local or remotely accessible. The software includes computer programs, firmware, or some other form of machine-readable instructions, and may include an operating system, utilities, drivers, network interfaces, applications, or some other type of software, including combinations thereof. Controller node 608 can receive instructions and other input at a user interface.

Presence node 610 is configured to accept, store, and communicate presence information associated with users of system 600. In an exemplary embodiment, presence node 610 is a presence server that stores information associated with the ability and willingness of a user of system 600 to communicate. For example, the presence information is utilized to create a personal availability record of a user of system 600 where the personal availability record can be made available for distribution to one or more other users of system 600. The presence information can include at least one of a location indication of a user, a communication status of a user such as "available", "busy", "away", etc., a unique message provided by the user, etc. The presence information can be communicated to other users to represent the presence and/or availability of a specific user. The presence information can be determined for each user of the system 600 or any specifically identified user.

Presence node 610 includes an interface having one or more transceivers for transmitting and receiving data over communication system 600. In an exemplary embodiment, presence node 610 can include a transceiver associated with at least a wireless protocol, at least one wired protocol, and/or other type of communication protocol.

Presence node 610 can include a processor and associated circuitry to execute or direct the execution of computer-readable instructions to obtain information. Presence node 610 can retrieve and execute software from storage, which can include a disk drive, a flash drive, memory circuitry, or some other memory device, and which can be local or remotely accessible. The software includes computer programs, firmware, or some other form of machine-readable instructions, and may include an operating system, utilities, drivers, network interfaces, applications, or some other type of software, including combinations thereof.

In operation, system 600 can facilitate communication of presence information of a user associated with mobile devices 602, 612, 622. One or more conference devices 606, 616, 626 can be used to establish a conference between different locations within system 600. Each time one of the mobile devices 602, 612, 622 enters the corresponding broadcast areas 605, 615, 625, the individual mobile device transmits a location identification indication to the controller node 608 and the controller node 608 determines whether a conference has been established. When the controller node 608 determines that a conference has been established and that the mobile device associated with an invited participant of an established conference at the location of the mobile device, the controller node 608 initiates updating the presence indicator associated with the user of the mobile device. The controller node 608 instructs all of the devices associated with confirmed participants of the conference to update the presence status of the corresponding user. For example, controller node 608 can transmit a message to mobile devices 602, 612, 622 instructing them to update the presence status to include the user that has just entered a broadcast area within the system 600.

The exemplary systems and methods described herein can be performed under the control of a processing system executing computer-readable codes embodied on a computer-readable recording medium or communication signals transmitted through a transitory medium. The computer-readable recording medium is any data storage device that can store data readable by a processing system, and includes both volatile and nonvolatile media, removable and non-removable media, and contemplates media readable by a database, a computer, and various other network devices.

Examples of the computer-readable recording medium include, but are not limited to, read-only memory (ROM), random-access memory (RAM), erasable electrically programmable ROM (EEPROM), flash memory or other memory technology, holographic media or other optical disc storage, magnetic storage including magnetic tape and magnetic disk, and solid state storage devices. The computer-readable recording medium can also be distributed over network-coupled computer systems so that the computer-readable code is stored and executed in a distributed fashion. The communication signals transmitted through a transitory medium may include, for example, modulated signals transmitted through wired or wireless transmission paths.

The foregoing detailed description of the certain exemplary embodiments has been provided for the purpose of explaining the principles of the invention and its practical application, thereby enabling others skilled in the art to understand the invention for various embodiments and with various modifications as are suited to the particular use contemplated. This description is not necessarily intended to be exhaustive or to limit the invention to the precise embodiments disclosed. The specification describes specific examples to accomplish a more general goal that may be accomplished in another way.

The invention claimed is:

1. A method of communicating presence information, comprising:
   receiving (202) at a controller node (108, 608) a location identification indication from a mobile device (102, 602, 612, 622), wherein the location identification indication is based on a location identifier received at the mobile device (102) from a broadcast node (104, 604, 614, 624), wherein the mobile device (102) receives the location identifier when the mobile device (102) is located within a broadcast area (105) of the broadcast node (104), wherein a conference device (106) is located within the broadcast area (105) of the broadcast node (104);
   determining (204) a conference status criteria of the mobile device (102) at the controller node (108), wherein the conference status criteria is based on the location identification indication and a device identifier associated with the mobile device (102), wherein determining that the conference status criteria of the mobile device is met comprises:
      determining that the mobile device (102) is at a location within the broadcast area (105) of the broadcasting node (104),
      determining (302) that a conference is established using the conference device (106), and
      determining (306) that the mobile device (102) is associated with an invited participant of the conference based on the device identifier associated with the mobile device (102); and
   instructing a presence node (110, 610) to update (206) a presence indication associated with the mobile device (102) when the mobile device meets the conference status criteria, wherein the presence indication represents the presence of the user at the conference.

2. The method of claim 1, further comprising
   transmitting a message from the controller node (108) to each confirmed participant of a conference, wherein the message includes instructions to update (206) the presence indication associated with the mobile device (102) when the mobile device meets the conference status criteria.

3. The method of claim 1, wherein the location identifier received at the mobile device (102) is a globally unique identifier (GUID) associated with the broadcast node (104).

4. The method of claim 1, wherein determining the conference status of the mobile device (102) further comprises
   determining (310) whether the mobile device is permitted to participate in the conference when the mobile device (102) is associated with an uninvited participant of the conference.

5. The method of claim 1, wherein determining whether the mobile device (102) is associated with an invited participant of the conference comprises comparing the device identifier of the mobile device (102) to a predetermined list of device identifiers associated with conference participants.

6. The method of claim 1, further comprising
   receiving an indication from the mobile device (102) to communicate the presence indication associated with the mobile device (102); and
   instructing the presence node (110) to update the presence indication associated with the mobile device (102) when the mobile device (102) meets the conference status criteria and the indication from the mobile device (102) to communicate the presence indication associated with the mobile device (102) has been received.

7. The method of claim 1, further comprising:
   instructing the mobile device (102) to update (308) a listing of conference participants at the mobile device when the mobile device meets the conference status criteria.

8. The method of claim 1, further comprising
   instructing the presence node (110) to maintain (304) a current presence indication associated with the mobile device (102) when the mobile device does not meet the conference status criteria.

9. A controller node (108) configured to
   receive a location identification indication (202) from a mobile device (102), wherein the location identification indication is based on a location identifier broadcast within a predetermined broadcast area (105) of a broadcast node (104), wherein the mobile device (102) received the location identifier when the mobile device (102) is located within a broadcast area (105) of the broadcast node (104), wherein a conference device (106) is located within the broadcast area 105 of the broadcast node (104),
   determine a conference status criteria (204) of the mobile device (102), wherein the conference status criteria is based on the location identification indication and a device identifier associated with the mobile device (102), wherein determining that a conference status criteria of the mobile device is met comprises:
      determining that the mobile device (102) is at a location within the broadcast area (105) of the broadcasting node (104),
      determining (302) that a conference is established using the conference device 106), and determining (306) that the mobile device (102) is associated with an invited participant of the conference based on the device identifier associated with the mobile device (102), and instruct a presence node to update a presence indication (206) associated with the mobile device (102) when the mobile device (102) meets the conference status criteria, wherein the presence indication represents the presence of the user at the conference.

10. The controller node (108) of claim 9, further comprising a look-up table, the look-up table comprising a record for each of the broadcast nodes (104), the record including the location identifier.

11. The controller node (108) of claim 9, wherein the record further comprises an identifier of a conference device (106) located at the same location as the broadcast node 104.

12. The controller node (108) of claim 9, wherein the record further comprises a location name associated to the location identifier, the location name being related to the broadcast area (105) of the broadcast node (104).

13. The controller node (108) of claim 10, further configured to match the location identification indication received from the mobile device (102) to the location identifier of the broadcast node (104) which is stored in the look-up table.

14. The controller node (108) of claim 10, further configured to send to the broadcast node (104) the location identifier which is stored in the look-up table.

15. A system (100) of communicating presence information, comprising:

the controller node (108) of claim 9, the broadcast node (104) configured to broadcast the location identifier within the predetermined broadcast area, the conference node (106) configured to establish the conference over a communication system, the presence node (110) configured to receive instructions to update the presence indication (206) associated with the mobile device (102).

16. The system of claim 15, wherein the broadcast node (104) is further configured to receive and store the location identifier.

17. The system of claim 15, wherein the broadcast node (104) is further configured to transmit the location identifier to the mobile device when the mobile device (102) is located within the predetermined broadcast area (105) of the broadcast node (104).

* * * * *